United States Patent [19]

Kreuzer

[11] 3,944,270

[45] Mar. 16, 1976

[54] HYDROPNEUMATIC SHOCK ABSORBING MOUNTED BUMPER

[75] Inventor: Dieter Kreuzer, Schweinfurt am Main, Germany

[73] Assignee: Fichtel & Sachs AG, Schweinfurt am Main, Germany

[22] Filed: Sept. 10, 1973

[21] Appl. No.: 395,656

[30] Foreign Application Priority Data

Sept. 16, 1972 Germany............................ 2245590

[52] U.S. Cl. .................. 293/70; 213/43; 213/223; 267/116; 267/120; 267/139; 293/84; 293/89
[51] Int. Cl.². B60R 19/06; B61F 19/04; F16F 5/00; F16F 9/06
[58] Field of Search ........... 267/116, 118, 119, 120, 267/121, 122, 123, 64 A, 64 B, 8 R, 139; 293/1, 60, 70, 86, 84, 89; 213/43, 223

[56] References Cited
UNITED STATES PATENTS

| | | | |
|---|---|---|---|
| 1,702,675 | 2/1929 | Ventura | 267/8 R X |
| 3,215,426 | 11/1965 | Engels | 267/116 |
| 3,326,546 | 6/1967 | Otto | 267/64 B |
| 3,567,042 | 3/1971 | Borgo | 267/64 A X |
| 3,700,273 | 10/1972 | Jackson et al. | 267/139 X |
| 3,804,443 | 4/1974 | Komatsu | 267/116 X |

*Primary Examiner*—Robert J. Spar
*Assistant Examiner*—Howard Beltran
*Attorney, Agent, or Firm*—Hans Berman

[57] ABSTRACT

The bumper of a vehicle is secured to the vehicle chassis by shock absorbers having each a cylinder attached to the vehicle chassis and a hollow piston assembly attached to the bumper. Liquid in the cylinder communicates with liquid in the piston assembly through a throttling passage in the piston, and a compressed gas cushion acting on the liquid in the piston assembly biases the assembly outward of the cylinder cavity against an abutment. The initial gas pressure and dimensions of the shock absorber are so selected that the total energy absorbed by the shock absorber while the piston assembly is pushed from its normal to its innermost position by the greatest impact energy capable of being totally absorbed is consumed to at least 20% by reversible compression of the gas cushion.

5 Claims, 4 Drawing Figures

HYDROPNEUMATIC SHOCK ABSORBING MOUNTED BUMPER

This invention relates to the protection of motor vehicles against damage by low-speed collisions, and particularly to a hydropneumatic shock absorber to be installed between the chassis and bumper of a vehicle, and to a vehicle equipped with such shock absorbers.

It is known to install piston-and-cylinder type, fluid-filled shock absorbers between a bumper and the chassis of an automotive vehicle for dissipating the energy of a low-speed collision without serious damage to the vehicle. A liquid is driven in the known arrangements by the force of the impact through a throttling passage in which the kinetic energy of the flowing, viscous liquid is converted to thermal energy. If a resilient element, such as a spring or a cushion of gas under pressure, is provided, it serves mainly to expel the piston from the cylinder after the impact, and thereby to restore the original condition of the shock absorber if the latter was not damaged in the collision.

The known devices are temperature-sensitive because of changes in the initial viscosity of the liquid with the ambient temperature. The further temperature change caused by the absorbed energy of impact is unpredictable, thereby affecting the reliability of the device. The coefficient of thermal expansion of the liquids commonly employed in shock absorbers is quite high, and the temperature rise caused in the liquid by the absorbed energy produces high internal pressure in the shock absorber. The shell of the shock absorber must be made correspondingly heavy.

The invention aims at avoiding the afore-described short-comings of the known fluid-filled shock absorbers.

It has been found that the amount of gas in a shock absorber and the gas pressure can be increased without disadvantage until as much as 50% of the impact energy is reversibly consumed in compressing the gas, only the remainder being irreversibly converted to thermal energy by throttling a stream of flowing liquid. The afore-described problems created by the rise in the temperature of the liquid during operation of the shock absorber are greatly mitigated in the modified shock absorbers of the invention.

Other features, additional objects, and many of the attendant advantages of this invention will readily be appreciated as the same becomes better understood by reference to the following detailed description of preferred embodiments when considered in connection with the appended drawing in which.

Figure 1:
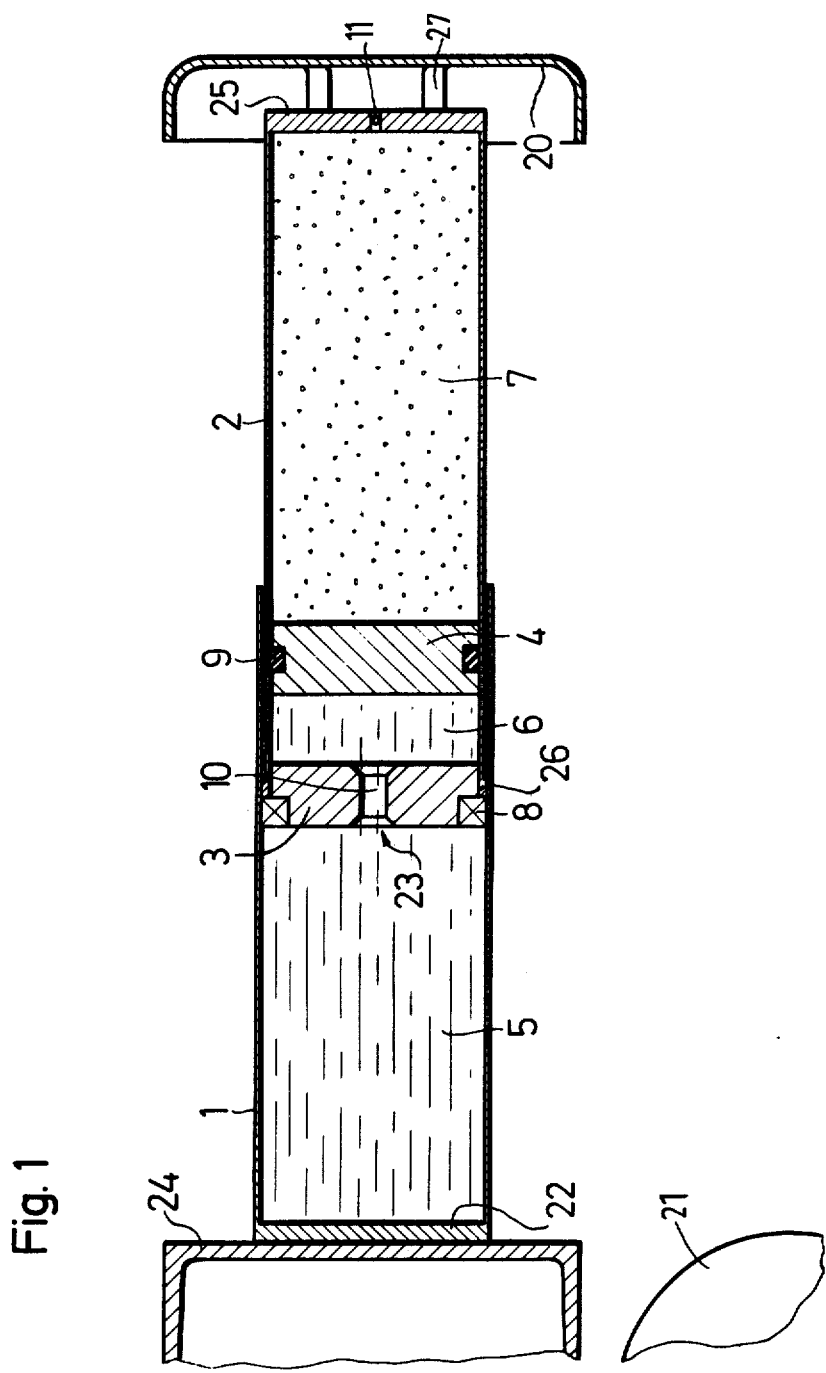
FIG. 1 shows a motorcar equipped with a shock absorber of the invention in fragmentary, side-elevational section.

Referring intially to FIG. 1, there is shown only as little of an otherwise conventional passenger car as is needed for an understanding of this invention, the conventional portion of the car being represented by respective portions of the vehicle chassis 24 and of one of the four wheels 21. The front bumper 20 is attached to the chassis 24 by two or more identical shock absorbers distributed over the length of the bumper 20, only one shock absorber being illustrated.

The cavity of its cylinder 1 is closed at one axial end by a radial end wall 22 directly fastened to the chassis 24. A piston rod 2 projects from the other axial end of the cylinder cavity, and its radial outer end wall 25 is fixedly fastened to the bumper 20 by brackets 27.

The piston rod 2 provides the cylindrical axial wall of a hollow piston assembly closed in an axially outward direction by the afore-mentioned end wall 25, and in an axial direction inward of the cylinder 1 by a piston 3, slightly greater in diameter than the piston rod 2 and sealingly engaging the inner wall of the cylinder 1.

The hollow interior of the piston assembly is axially divided into two compartments by a floating piston or partition 4. A first body 5 of liquid fills the cavity of the cylinder 1 from the end wall 22 to the piston 3. A second body 6 of liquid occupies the compartment of the piston assembly between the piston 3 and the partition 4, and a third fluid body 7 of compressed air or nitrogen fills the other compartment in the hollow interior of the piston assembly from the partition 4 to the end wall 25.

Sealing rings 8, 9 respectively seal the piston 3 and the partition 4 to the inner axial faces of the cylinder 1 and of the piston rod 2. An axial, central passage 23 in the piston 3 has respective orifices in the cylinder cavity and in the hollow interior of the piston assembly so as to provide permanent communication of constant flow section between the liquid bodies 5, 6. The central portion 10 of the passage 23 is restricted to a smaller diameter than that of the passage orifices for throttling liquid flow.

The gas of the body 7 may be introduced into the piston assembly through a check valve 11 in the end wall 25 of the piston rod 2, and an analogous check valve, not shown, permits liquid to be introduced into the cylinder 1, thereby to increase the combined volume of the bodies 5, 6. The two check valves may also be employed to bleed gas or liquid from the shock absorber, if so desired.

The piston assembly is biased axially outward of the cylinder 1 by the pressure of the gas body 7, and such outward movement is prevented from going beyond the illustrated position by a collar 26 on the inner wall of the cylinder 1 abutting against the sealing ring 8 on the piston 3. Inward movement of the piston assembly cannot go beyond the non-illustrated position in which the piston 3 abuts against the end wall 22.

Upon collision of the vehicle with a fixed obstacle, the front bumper 20 pushes the piston assembly inward of the cylinder 1. The energy of impact is partly converted to thermal energy by the liquid of the body 5 flowing through the throttling passage 23 and joining the body 6, and partly stored in the gas of the body 7 which is compressed by the partition 4 as the latter is shifted by the practically non-compressible liquid of the growing body 6. The stored energy is ultimately consumed for pushing the vehicle away from the obstacle as the piston 3 is expelled from the cylinder 1 to the illustrated position.

Figure 2:
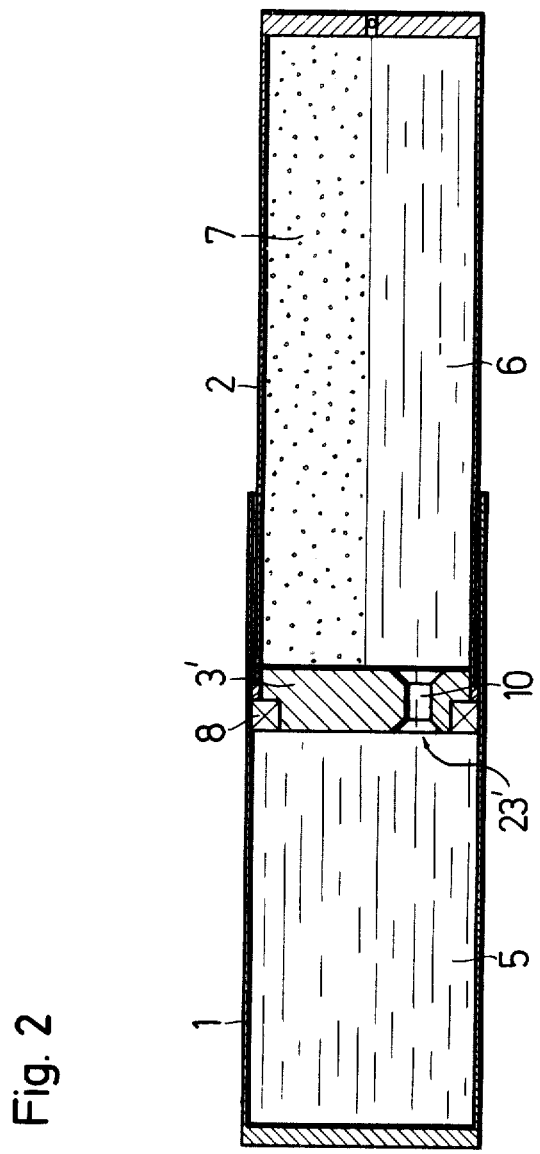
FIG. 2 shows a modification of the shock absorber of FIG. 1.

The modified shock absorber illustrated in FIG. 2 is identical with that described above with reference to FIG. 1 except for a piston 3' whose passage 23' is downwardly offset from the center of the piston, thereby making the floating partition 4 unnecessary.

In the modified shock absorber, the second body 6 of liquid and the third body 7 of gas are in direct contact in the hollow interior of the piston assembly along a horizontal interface located above the orifice of the passage 23' when the axis of the shock absorber is at least approximately horizontal, as is normally the case in an installed shock absorber.

The shock absorber shown in FIG. 2 operates in substantially the same manner as described above with reference to FIG. 1. The force with which the pistons 3, 3' resist inward movement into the cylinder 1 under an external force is due partly to the resiliency of the gas body 7, and further to the throttling effect of the passages 23, 23'.

Figure 3:
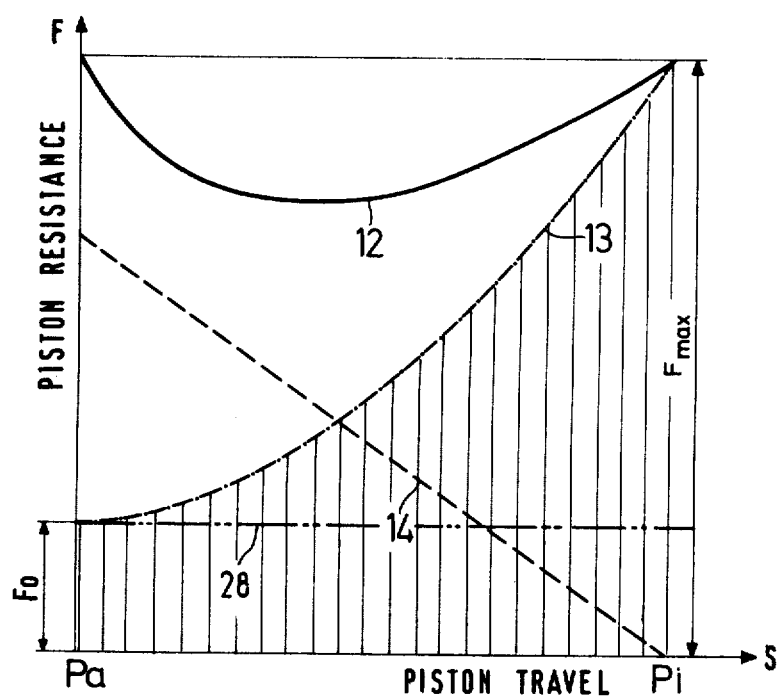
FIG. 3 is a simplified diagram illustrating the characteristics of a shock absorber of the invention.

The contributions of the two components of piston resistance during a collision between the vehicle and a fixed obstacle are shown diagrammatically in FIG. 3. The total force F of piston resistance is shown as a function of piston travel S inward of the cylinder cavity by a curve 12 in arbitrary linear units. A curve 13 illustrates the analogous relationship of the component due to compression of the gas body 7, and a practically straight line 14 represents the force component due to the liquid flow being throttled between the bodies 5 and 6. The lines 12 and 14 have been simplified for values of S near zero, as will presently be explained.

The gas body 7 initially presses the piston 3 against the collar 26 with a force $F_o$ which normally maintains the maximum axial length of the shock absorber. As the piston assembly travels inward of the cylinder 1 during a collision, the gas pressure, and thus the resistance of the gas component against further piston travel, increases at an accelerating rate with increasing values of S.

The component of piston resistance due to throttling of liquid flow in the shock absorber is a function of piston velocity. As the vehicle is gradually slowed by the shock absorber, the throttling effect is gradually diminished and becomes zero when the vehicle stops. The overall magnitude of the piston resistance F changes but little while the vehicle is being halted, as indicated by the curve 12, arrived at by adding values on the lines 13, 14 for equal values of S.

The total energy absorbed is represented by the area under the curve 12 downwardly bounded in FIG. 3 by a straight chain-dotted line 28 parallel to the abscissa S on the level of the resilient force $F_o$. The amount of kinetic energy converted to thermal energy is represented by the area between the line 28 and the abscissa S. The area between the lines 13 and 28 represents the energy stored during impact in the gas body 7, and consumed later during expansion of the shock absorber. No significant error is introduced by disregarding the conversion of kinetic energy to heat in the gas.

The diagram of FIG. 3 is based on the assumption that the shock absorber is used under the most severe conditions for which it is designed. Under these conditions, the piston 3 travels from its outermost position $P_a$, illustrated in FIG. 1, to its innermost position $P_i$ in which it touches the end wall 22, but does not transmit significant energy to the engaged wall. At this stage of piston travel, the vehicle and the piston are stopped, and the entire energy of the impact is either dissipated as heat or stored in the gas which alone provides the force $F_{max}$ with which the piston 3 is expelled from the cylinder 1 and the vehicle moved back from the obstacle after it stops.

For a vehicle of known weight, the energy of impact at any speed is precisely defined. It is presently preferred practice to provide bumpers with shock absorbers capable of absorbing the total energy released by the vehicle rolling under inertial forces on a horizontal surface against a fixed obstacle at 5 miles per hour. A set of shock absorbers, preferably two, is readily selected in such a manner that the piston assemblies of the shock absorbers will travel from the outermost position $P_a$ of FIG. 1 to the innermost position $P_i$ while the energy of impact is completely absorbed. The amounts of gas and liquid in each shock absorber of at least roughly adequate dimensions may be adjusted by trial and error to store a sufficient portion of this energy in the compressed gas, at least some of the advantages of this invention being available if at least 20% of the energy is stored in the gas. The amount of stored energy is readily determined from the force $F_{max}$ with which the fully compressed shock absorber tends again to expand, and it may be controlled for given service conditions and dimensions of the shock absorber, particularly the length of axial piston movement between positions $P_a$ and $P_i$, by suitably selecting the amount and ultimate pressure of the gas in the compressed body 7, and the volume change in the gas during the axial piston movement. Best results are obtained when compression of the gas absorbs 30% to 50% of the total collision energy.

Figure 4:
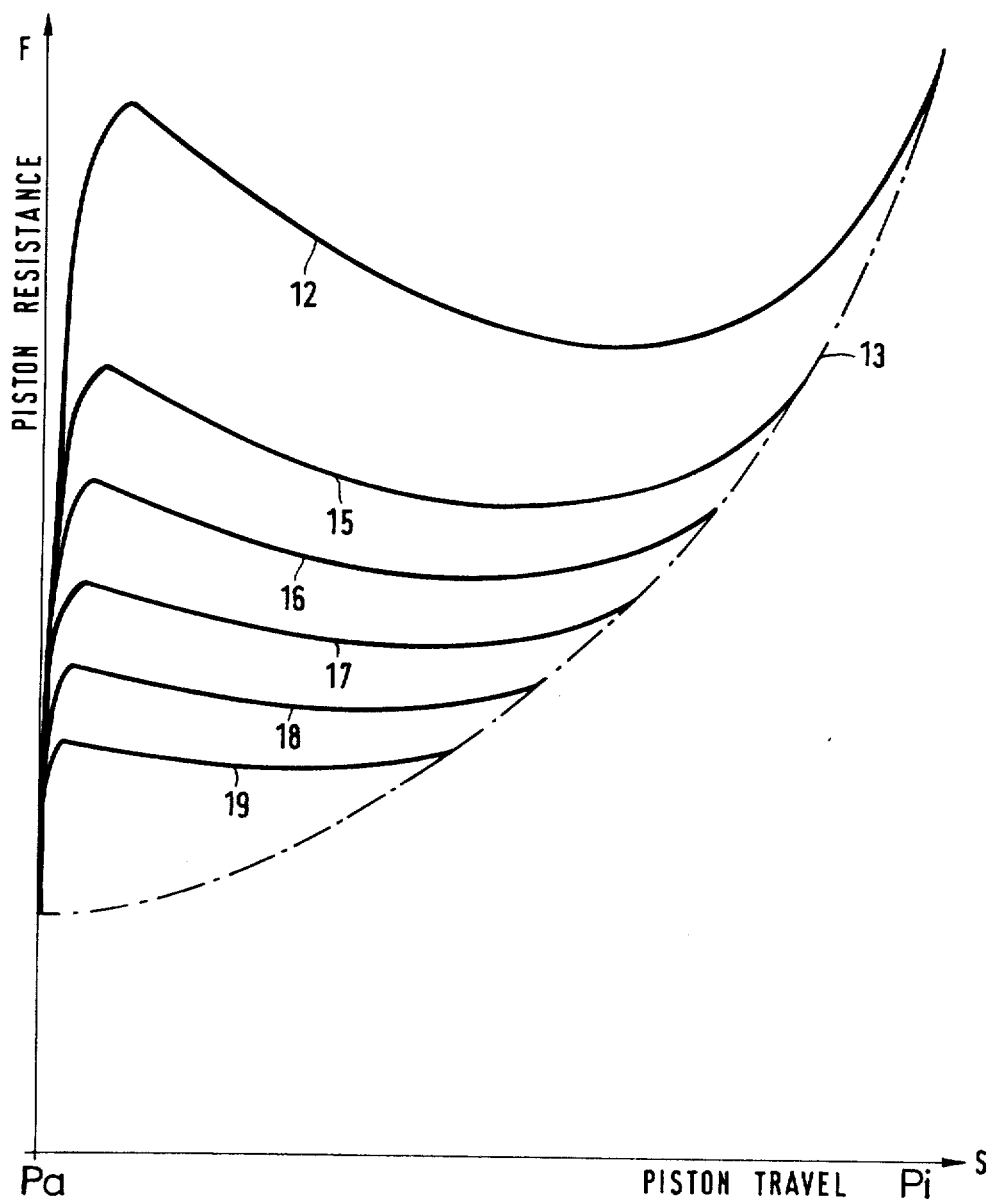
FIG. 4 illustrates the relationship of the shock absorber characteristic to vehicle speed on impact.

FIG. 4 shows the behavior of a shock absorber selected for a rated collision velocity of 5 miles per hour when absorbing the energy of a collision with a fixed obstacle at lower vehicle speeds. FIG. 4 more precisely shows the shape of the curve 12 at very low values of S. The liquid throttling effect is fully available only after the piston 3 reaches its maximum travelling speed inward of the cylinder 1. Until this condition is reached, the throttling force increases quickly from an initial value of $F_o$. The intial contribution of the gas body 7 to the piston resistance being small, the curve 12 actually, and as shown in FIG. 4, has an initial, steep, positive slope. For the sake of simplicity, this stage of energy absorption by the shock absorber was omitted from the showing of FIG. 3. Curve 12 in FIG. 4 otherwise illustrates a relationship identical with that represented by the corresponding line of FIG. 3, but FIG. 4 is drawn on a different scale.

FIG. 4 also shows the change of piston resistance as a function of piston travel if the vehicle bumper hits an obstacle at a speed of less than 5 miles per hour, the curves 15 to 19 showing readings obtained at respective vehicle speeds of 4.0, 3.65, 3.1, 2.7, 2.25 miles per hour. In each case, the vehicle came to a halt, and the throttling effect therefore was reduced to zero in a terminal position before the piston assembly reached its innermost position $P_i$. Piston resistance at this stage was furnished by the gas body 7 alone and was approximately equal to the resistance at maximum velocity of piston travel. All characteristic curves of shock absorber operation at rated or lower collision speed thus terminate at their intersections with the curve 13.

While single throttling passages 23, 23' are shown in FIGS. 1 and 2, several passages will normally be provided and distributed over the radial faces of the pistons 3, 3' in an obvious manner, partly conventional. The floating piston 4 in FIG. 1 may be replaced by a partition fixedly fastened to the inner wall of the piston rod 2, but pliable so as to move with the expanding and contracting liquid body 6. Bellows and flexible diaphragms are typical of such other movable partitions, known in themselves.

It should be understood, therefore, that the foregoing disclosure relates only to preferred embodiments of the invention, and that it is intended to cover all changes and modifications of the examples of the invention herein chosen for the purpose of the disclosure which do not depart from the spirit and scope of the invention set forth in the appended claims.

What is claimed is:

1. A hydropneumatic shock absorber for use between the chassis and bumper of an automotive vehicle comprising, in combination:
   a. a cylinder having an axis and a cavity closed at one axial end;
   b. a hollow piston assembly movable axially relative to said cylinder inward and outward of said cavity, said assembly including
      1. a piston sealingly engaging said cylinder while said assembly moves, and
      2. a piston rod fixedly fastened to said piston and axially projecting from the other axial end of said cavity;
   c. stroke limiting means for preventing said assembly from moving axially beyond a first innermost position and beyond a second outermost position relative to said cavity;
   d. a first body of liquid substantially completely filling the axial portion of said cavity between said piston and the closed axial end of said cavity;
   e. a second body of liquid in the hollow interior of said assembly;
   f. conduit means defining a permanently open throttling passage connecting said first and second bodies and having respective orifices in said cavity and in said interior,
      1. said conduit means including an integral wall of annular cross section bounding said orifices and connecting the same,
      2. the flow section of said passage being constant during axial movement of said assembly between said first and second positions; and
   g. a body of gas sealed in said interior in pressure-transmitting relationship with said second body,
      1. whereby the velocity of axial movement of said assembly inward of said cavity caused by applied external forces is descreased from an initial value by a resistance having a first component due to the throttling effect of said passage on the flow of said liquid and a second component due to the compression of said gas, and said movement is arrested in a terminal position of said assembly before said assembly reaches said first position when said initial value does not exceed a predetermined magnitude, said first component decreasing with the decreasing velocity of said assembly, and said second component increasing due to said assembly approaching said first position,
      2. the amount and pressure of said gas being sufficient to make said resistance in said terminal position approximately equal to said resistance at said predetermined magnitude of said velocity, and sufficient to move said assembly from said terminal position into said second position in the absence of applied external forces.

2. A shock absorber as set forth in claim 1, wherein said piston assembly is formed with said passage, said wall being an integral portion of said piston.

3. A shock absorber as set forth in claim 1, further comprising a partition movable in said interior and sealing said second body from said gas.

4. A shock absorber as set forth in claim 1, wherein said second body and said gas are in direct contact with each other and define an interface in said interior, said interface being above the orifice of said passage in said interior when said axis is at least approximately horizontal.

5. A shock absorbing arrangement comprising:
   a. a vehicle having a chassis and a wheel mounted on said chassis for permitting said vehicle to roll on a horizontal surface in a predetermined direction;
   b. a bumper;
   c. a shock absorber securing said bumper to said chassis in a position in which said bumper projects from said chassis in said direction, said shock absorber including:
      1. a cylinder member having an approximately horizontal axis and a cavity closed at one axial end;
      2. a hollow piston assembly movable axially relative to said cylinder inward and outward of said cavity, said assembly including
         i. a piston sealingly engaging said cylinder member while said assembly moves, and
         ii. a piston rod member fixedly fastened to said piston and axially projecting from the other axial end of said cavity, said members being fastened to said chassis and said bumper respectively;
      3. stroke limiting means for preventing said assembly from moving axially beyond a first innermost position and beyond a second outermost position relative to said cavity;
      4. a first body of liquid substantially completely filling the axial portion of said cavity between said piston and the closed axial end of said cavity;
      5. a second body of liquid in the hollow interior of said assembly;
      6. conduit means defining a permanently open throttling passage connecting said first and second bodies and having respective orifices in said cavity and in said interior,
         i. said conduit means including an integral wall of annular cross section bounding said orifices and connecting the same,
         ii. the flow section of said passage being constant during axial movement of said assembly between said first and second positions; and
      7. a body of gas sealed in said interior in pressure-transmitting relationship with said second body,
         i. whereby said assembly is moved axially inward of said cavity by abutting engagement of said bumper with a fixed obstacle when said vehicle collides with said obstacle while rolling on said surface under the inertia therof, the velocity of said inward movement is decreased from an initial value by a resistance having a first component due to the throttling effect of said passage on the flow of said liquid and a second component due to the compression of said gas, and said inward movement is arrested in a terminal position of said assembly before the assembly reaches said first position when said initial value does not exceed a predetermined magnitude, said first component decreasing with the decreasing velocity of said assembly, and said second component increasing due to said assembly approaching said first position, ii. the amount and pressure of said gas being sufficient to make said resistance in said terminal position approximately equal to said resistance at said predetermined magnitude of said velocity, and sufficient to move said assembly from said terminal position into said second position in the absence of applied external forces.

* * * * *